Figure 1:
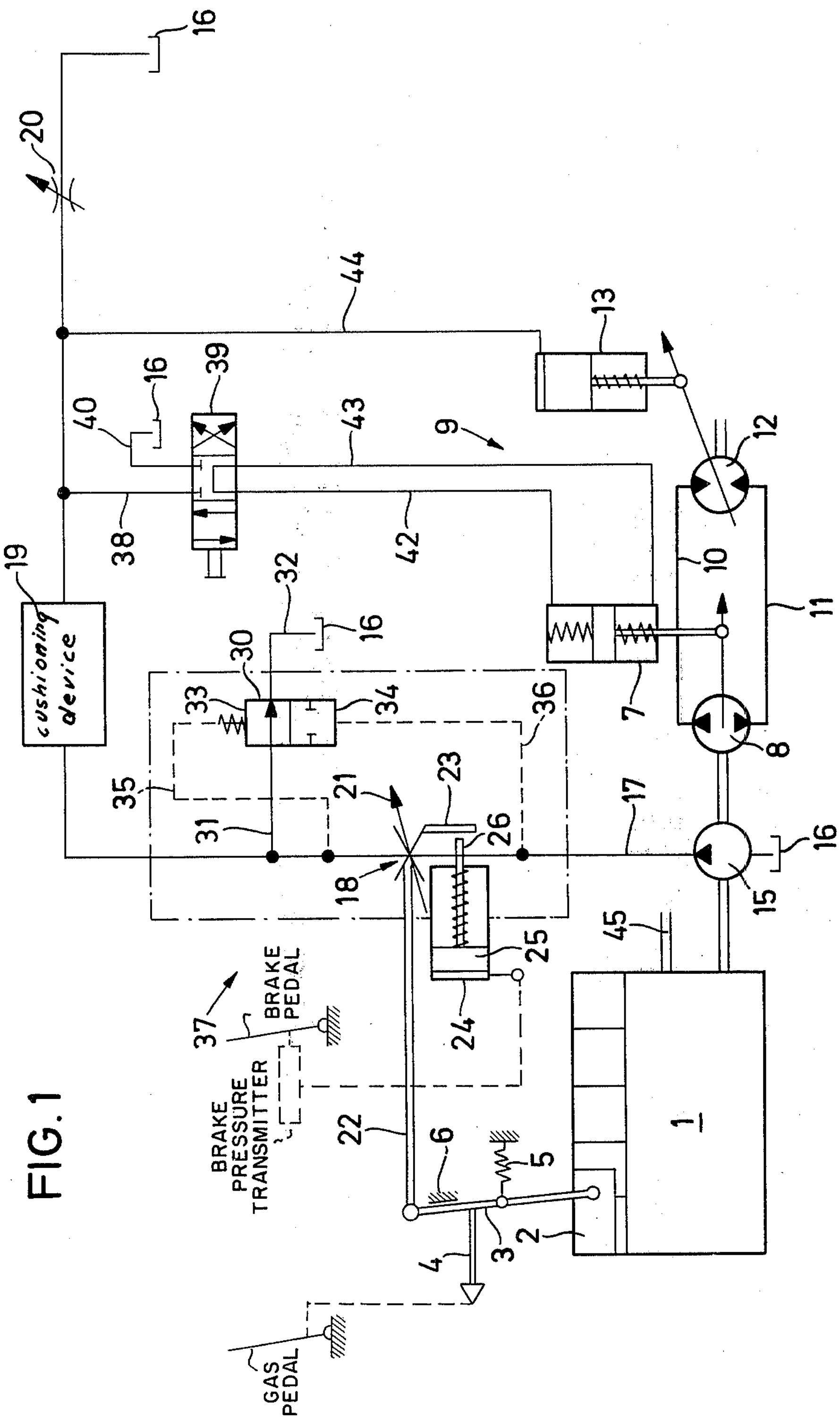

United States Patent [19]

Hoffmann

[11] 3,986,358

[45] Oct. 19, 1976

[54] HYDROSTATIC VEHICLE TRANSMISSION

[75] Inventor: Helmuth Hoffmann, Bensberg-Steinacker, Germany

[73] Assignee: Klöckner-Humboldt-Deutz Aktiengesellschaft, Germany

[22] Filed: Oct. 20, 1975

[21] Appl. No.: 623,786

[30] Foreign Application Priority Data

Oct. 19, 1974 Germany ........................... 2449464

[52] U.S. Cl. .................................... 60/431; 60/444; 60/447; 60/449; 60/468; 60/490

[51] Int. Cl.[2] ......................................... F16H 39/46

[58] Field of Search ............ 60/431, 433, 434, 445, 60/447, 449, 450, 468, 488, 490, 487, 444

[56] References Cited

UNITED STATES PATENTS

| | | | |
|---|---|---|---|
| 3,167,907 | 2/1965 | Kempson | 60/444 X |
| 3,214,911 | 11/1965 | Kempson | 60/450 X |
| 3,477,225 | 11/1969 | Cryder et al. | 60/433 |
| 3,533,234 | 10/1970 | Futamata et al. | 60/444 |

*Primary Examiner*—Edgar W. Geoghegan
*Attorney, Agent, or Firm*—Walter Becker

[57] ABSTRACT

A hydrostatic vehicle transmission with a primary and-/or secondary part adjustable as to its delivery and its absorption capacity respectively. The hydraulic adjusting elements of said primary and/or secondary part are automatically by spring force adjusted in the direction toward their starting position and are connected to a control circuit which is adapted to be connected to the pressure conduit of a constant delivery pump and is also adapted for controlling the control pressure to be connected to a return line by means of a control member. An adjustable orifice of a limit load control is arranged in the pressure line, which orifice is arranged ahead of the connection of the control member when looking in flow direction. The adjusting member of said limit load control may for instance be connected to the gas pedal or manually operable gas lever of an internal combustion engine for instance a Diesel engine while the hydrostatic vehicle transmission also serves as vehicle brake. The brake pedal of the vehicle is operatively connected to a control member which is operable to control the control pressure in the flow direction ahead of the limit load control. This connection is such that in response to the actuation of the brake pedal, the control pressure will be reduced.

4 Claims, 2 Drawing Figures cushioning device
BRAKE PEDAL
BRAKE PRESSURE TRANSMITTER
GAS PEDAL 1
37
18
9
19
20
30
33
34
16
51
49
brake pedal
47
50
48
17
15
16

HYDROSTATIC VEHICLE TRANSMISSION

The present invention relates to a hydrostatic vehicle transmission with a primary and/or secondary part adjustable as to its delivery and its absorption capacity respectively. The hydraulic adjusting elements of said primary and/or secondary part are automatically by spring force adjusted in the direction toward their starting position and are connected to a control circuit which is adapted to be connected to the pressure conduit of a constant delivery pump and is also adapted for controlling the control pressure to be connected to a return line by means of a control member. An adjustable orifice of a limit load control is arranged in the pressure line which orifice is arranged ahead of the connection of the control member when looking in flow direction. The adjusting member of said limit load control may, for instance, be connected to the gas pedal or manually operable gas lever of an internal combustion engine while the hydrostatic vehicle transmission also serves as vehicle brake.

With a vehicle for use in agriculture which is provided with a hydrostatic transmission of the above mentioned type, it is necessary for instance during the operation of the power take-off shaft that a constant speed of the prime mover effecting the drive be maintained. The constant speed of the power take-off shaft should also be maintained when braking the vehicle in order to avoid for instance a clogging of the working implement connected to the power take-off shaft. If the vehicle is to be braked, this can be realized by reducing the driving speed by correspondingly changing the transmission ratio in the hydrostatic transmission. It is also possible simultaneously to actuate separate vehicle brakes. At any rate, for purposes of changing the transmission ratio of the hydrostatic transmission, it is necessary that the control member provided for this purpose, namely the so-called driving choke and the driving pressure check valve be adjusted accordingly. Following the braking operation, it becomes then necessary for the further operation of the vehicle to adjust the control member for instance the driving choke again to the predetermined value. Such operation is awkward and time consuming.

For purposes of adjusting the internal combustion engine of an agricultural vehicle by means of a hydrostatic transmission of the above mentioned type so as to have a constant speed, in most instances a manually operable gas control lever is provided which is used when working in the field. Customarily, this manually operable gas lever is also used when driving the vehicle on streets. In the last mentioned instance, however, there exists the great danger that the driver during a sudden actuation of the brake leaves the driving lever in the adjusted driving position. Consequently, the vehicle is not braked but the vehicle will, through the intervention of the limit load control which behaves as if suddenly a higher load is acting upon the engine, adjust the hydrostatic transmission to a corresponding transmission ratio so that the vehicle in spite of the actuation of the brake will be driven at full force. Consequently, when employing the hydrostatic driving transmission as vehicle brake, it is necessary to actuate the control member, for instance a driving choke, which control member is provided for such purposes and therefore is connected to a so-called driving lever. This is necessary in order to reduce the driving speed by a corresponding change in the transmission ratio in the hydrostatic transmission. After the braking operation it is then necessary for further operating the vehicle, to adjust the control member each time anew to the predetermined maximum speed. This is likewise awkward and time consuming.

It is, therefore, an object of the present invention to improve a hydrostatic vehicle transmission of the above mentioned type while overcoming the above mentioned drawbacks so that the hydrostatic vehicle transmission can independently of the position of the manually operable gas lever or the foot operated gas pedal and independently of the position of the control member be influenced in the direction of a braking effect being exerted upon the vehicle.

These and other objects and advantages of the invention will appear more clearly from the following specification in connection with the accompanying drawings, in which:

FIG. 1 diagrammatically illustrates a control device for a hydrostatic transmission, in which the brake pedal through the intervention of an adjustable cylinder-piston system engages the adjustable choke of the limit load control independently of the governor for the internal combustion engine.

Figure 2:
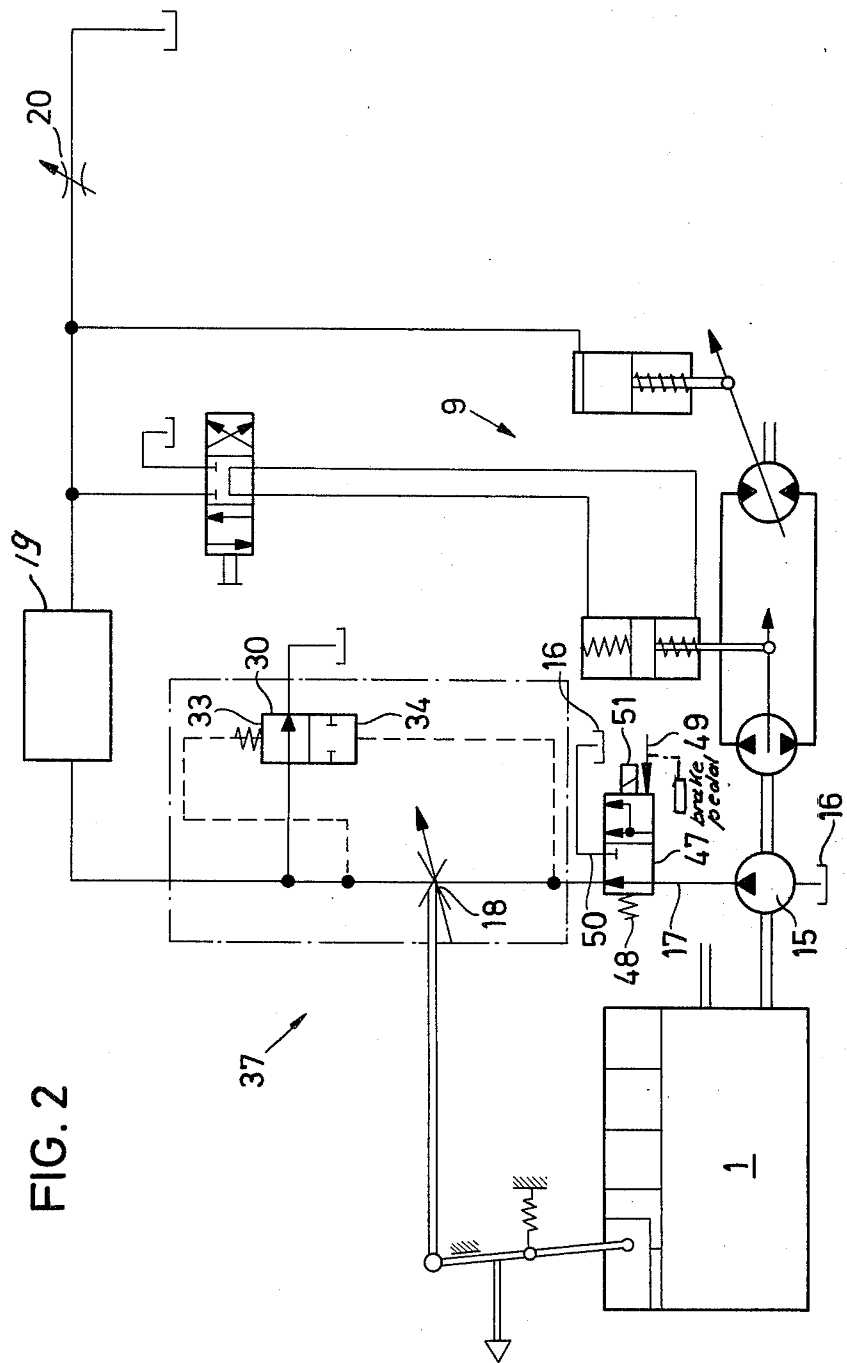

FIG. 2 shows a similar control device with a flow-off valve arranged ahead of the limit load control and coupled to the brake pedal.

The hydrostatic vehicle transmission according to the present invention is characterized primarily in that the brake pedal of the vehicle is connected to a control member which controls the control pressure in the flow direction ahead of the limit load control in such a way that each time in response to the actuation of the brake pedal, the control pressure is reduced.

By reducing the control pressure ahead of the limit load control, the latter likewise reduces the control pressure in the control system following said limit load control. Thus, without adjustment, for instance of the manually operable gas lever, a return of the units of the hydrostatic transmission and thus a braking of the vehicle will be realized. The change in the control pressure in the control pistons for braking the vehicle will, however, also be realized without adjustment of the driving choke or the driving pressure limiting valve. This is of advantage, for instance, in connection with the operation of an implement with take-off shaft, because for again starting the vehicle, the awkward new adjustment of the driving choke and of the driving pressure limiting valve in conformity with the constant speed required for the shaft power take-off operation will not be necessary.

According to a further development of the invention, the brake pedal is operatively connected to the adjusting member of the adjustable orifice of the limit load control independently of the gas pedal and independently of the operation of the manually operable gas lever.

The transmission according to the invention may further be so designed that the brake pedal is operatively connected to a flow-off valve which when viewing in flow direction is arranged ahead of the limit load control and located in the pressure line, said flow-off valve being continuously urged by spring means in closing direction.

Referring now to the drawings in detail, FIG. 1 shows an internal combustion engine 1 designed as a Diesel engine and provided with a governor 2 for controlling the quantity of fuel injection. The governor 2 is through a linkage system 3,4 connected to a nonillustrated pedal for adjusting the speed. In its starting position, the linkage 3, due to the force of the return spring 5 engages an abutment 6. Coupled to the internal combustion engine 1 is a hydropump 8 which by means of a hydraulic control cylinder-piston system 7 is adjustable as to delivery and direction of delivery. This pump 8 forms the primary part of an infinitely variable hydrostatic transmission 9. The hydropump 8 is by means of conduits 10 and 11 in a closed circuit connected to a hydromotor 12 which serves as secondary part of a hydrostatic transmission 9. For purposes of adjusting the hydromotor to the desired volume of delivery, said hydromotor is coupled to an adjusting cylinder piston system 13. A constant delivery pump 15 which is driven in conformity with the speed of the internal combustion engine serves for supplying the control system of the hydrostatic adjusting cylinder-piston systems 7 and 13. This constant delivery pump 15 has its suction side arranged for communication with a storage container 16 while its pressure side communicates with a pressure line 17. The pressure line 17 is through an adjustable orifice 18, a cushioning device 19, and an adjustable throttle 20 connected to the return line, i.e., to the storage container 16. The orifice 18 comprises an adjusting member 21 which for purposes of operation is through a rod 22 linked to a linkage system 3. In addition to the rod 22, also a lever 23 is operatively connected to the adjusting member 21 of the orifice 18. By means of the lever 23, the adjusting member 21 can be operated independently of the position of the rod 22. An adjusting cylinder 24 of a cylinder-piston system 24, 25 which is hydraulically coupled to a non-illustrated brake pedal, comprises a piston 25 the piston rod 26 of which will, when being actuated, act upon a lever 23. A two-way valve 30 which is spring urged continuously into open direction is connected on one hand through a conduit 31 to line 17 which when viewed in flow direction is located behind the orifice 18, and on the other hand is by means of a conduit 32 connected to a storage container 16. The two end faces 33 and 34 of the two-way valve 30 are for controlling the same respectively connected through conduits 35 and 36 with the pressure line ahead of and behind the orifice 18. The orifice 18 and the two-way valve 30 form structural elements of a limit load control 37. A conduit 38 which branches off from conduit 17 behind the cushioning device 19 communicates with a manually adjustable three-way valve 39. This conduit 38 is blocked in the illustrated neutral position "N" of the valve 39. Furthermore, the three-way valve 39 communicates through a conduit 40 with the storage container 16 and through two conduits 42 and 43 communicates with the control cylinder 7. This pressure control line 17 is furthermore by means of a conduit 44 connected to the control cylinder 13. A speed responsive power take-off shaft 45 is arranged on the internal combustion engine 1.

When idling the internal combustion engine 1, the linkage system 3 engages the abutment 6, and the rod 22 as well as the adjusting member 21 of the orifice 18 occupy their starting position. The orifice 18 is with this starting position so adjusted that the quantity of pressure fluid delivered by the constant delivery pump during the idling of the internal combustion engine 1 and the pressure thereby exerted upon the end face 34 of the valve 30 are not able to displace the valve 30 to its closing position. If now the speed of the internal combustion engine 1 by pivoting the linkage 3 in counter-clockwise direction is increased, the rod 22 is displaced toward the left with regard to the drawing as a result of which the adjusting member 21 of the orifice 18 is actuated. As a result thereof, in the pressure line ahead of the orifice 18 and also in conduit 36 and thus at the end face 34 of valve 30, a pressure builds up which overcomes the pressure acting upon the end face 33 and the thrust of the here acting spring so that the valve 30 is moved to its closing position. The valve 30 blocks the conduit 31 so that in the control system of the two cylinder-piston systems 7 and 13 as a result of the adjustment of the throttle 20, a corresponding pressure for adjusting the hydropump 8 and the hydromotor 12 can be set. The three-way valve 39 serves for pre-selecting the delivery direction of pump 8 and is adjusted in conformity with the desired driving direction of the vehicle.

If the internal combustion engine 1 is under high load so that the speed drops, the quantity of delivery of the constant delivery pump 15 decreases so that the pressure drops in the conduits in flow direction ahead of the orifice 18 and thus also at the end face 34 of the valve. The valve 30 due to the pressure acting upon its end face 33 and due to the thrust of the spring is opened so that the control system is through valve 30 connected to the return conduit whereby the pressure drops in the control system. The two adjusting cylinder-piston systems 7 and 13 adjust the hydropump 8 and the hydromotor 12 to a lower transmission ratio so that again a normal load on the internal combustion engine 1 is realized and the latter will again have the pre-determined speed. Due to the fact that the speed of the internal combustion engine has again increased, also the quantity of delivery of the constant pump 15 has again increased to such an extent that the pressure acting upon the end face 34 of the valve moves the valve to its closing position. With the unchanged throttle 20, the pressure in the control system again increases to its previous value, and the two adjusting cylinder-piston systems 7 and 13 adjust the hydropump 8 and hydromotor 12 again to their original transmission ratio. In this way, the condition of the plant is restored to the condition it had prior to the brief higher load acting on the internal combustion engine.

When the linkage system 3,4 is returned from a position of operation to the illustrated starting position, also the adjusting member 21 of the orifice 18 is moved to the illustrated starting position. Due to the drop in the speed of the internal combustion engine 1 and of the constant delivery pump 15, the pressure acting on the end face 34 of the valve 30 drops so that the latter opens. The pressure in the control system breaks down, and the two adjusting cylinder-pistons 7 and 13 move the hydromotor 12 and hydropump 8 to their neutral starting position.

When during the normal driving operation of the vehicle the non-illustrated brake pedal is actuated, the piston 25 in the adjusting cylinder 24 moves lever 23 through the intervention of the piston rod 26. This adjustment brings about that the adjusting member 21 of the orifice 18 is independently of its position between rod 22 and the gas pedal coupled thereto further adjusted in the direction toward a greater cross section. Inasmuch as in this connection the speed of the internal combustion engine 1 and thus also the quantity of delivery of the constant delivery pump 15 remain substantially constant, the pressure upon the end face 34 of the valve 30 drops and valve 30 opens. The pressure in the control system likewise drops correspondingly, and the hydrostatic transmission 9 is returned to a position in which it exerts a braking effect upon the vehicle. After the brake pedal has been released, the control pressure which prevailed in the control system prior to the braking operation is immediately restored because the throttle 20 has not been adjusted. Moreover, the power take-off shaft 45 will with each braking operation substantially retain its predetermined speed. It is a matter of course that the brake pedal may also in contradistinction to the illustrated embodiment, be linked directly to the lever 23.

FIG. 2 shows the same details illustrated in FIG. 1 with the same reference numerals. With the arrangement of FIG. 2, a two-way valve 47 is interposed in conduit 7 ahead of the limit load control 37, when looking in flow direction. Valve 47 is spring loaded by a spring 48. The two-way valve 47 illustrated in its starting position can be actuated by a non-illustrated brake pedal by suitable means in the direction of the arrow 49. In its other end position, the two-way valve 47 establishes through conduit 15 a direct communication of the conduit 17 with the storage container 16. A brake light switch 51 is coupled to the two-way valve 47.

The operation of this drive corresponds at normal driving operation to that of the drive of FIG. 1. If, for purposes of braking the vehicle from the normal driving operation the non-illustrated brake pedal is actuated, the two-way valve 47 moves to its left hand end position. Due to the direct connection of conduit 17 through two-way valve 47 with the storage container 16, the pressure at the end face 34 of valve 30 drops and the latter opens in view of the thrust of its associated spring and in view of the pressure acting upon the end face 33. The opening of valve 30 brings about a drop in the pressure in the control system of the hydrostatic transmission 9 whereby said control system is moved back in the direction toward its starting position and consequently exerts a corresponding braking effect upon the vehicle. After releasing the brake pedal, the two-way valve 47 will due to the thrust of the spring 48 return to the illustrated starting position. Thus, at the end face 34 of valve 30 a pressure is again built up which pressure moves the valve 30 likewise to its closing position. Finally, within the control system of the hydrostatic transmission 9 the pressure is restored which prevailed prior to the braking operation, because the choke 20 was not adjusted. The power take-off shaft 45 will with this braking operation substantially retain its predetermined speed.

It is, of course, to be understood that the present invention is by no means limited to the specific showing in the drawings, but also comprises any modifications within the scope of the appended claims.

What I claim is:

1. For use in combination with an internal combustion engine having a speed control element associated therewith, a hydrostatic vehicle transmission which includes: a primary and/or secondary part, hydraulic adjusting means associated with at least one of said parts and continuously urged into a first position forming the starting position of said hydraulic adjusting means, a control circuit, said at least one part being connected to said control circuit, a constant delivery pump having its pressure side connectable to said circuit, fluid return conduit means forming part of said control circuit for returning fluid from said control circuit to a fluid reservoir, said reservoir being connectable to the suction side of said constant delivery pump, and adjustable orifice means interposed in said control circuit ahead of said hydraulic adjusting means when looking in the direction of flow of fluid from the pressure side of said constant delivery pump, said adjustable orifice means including an adjusting member connectable to a speed control element of an internal combustion engine, said adjusting member being so connectable to a brake member of a vehicle to be equipped with said hydrostatic vehicle transmission as to reduce this control pressure in said control circuit in response to the actuation of said brake member.

2. A transmission according to claim 1, which includes actuating means operatively connected to said adjusting member and operable independently of the speed control element of the internal combustion engine for which said hydrostatic vehicle transmission is intended.

3. A transmission according to claim 1, which includes a two-way valve interposed between said constant delivery pump and said adjustable orifice means, a brake member operatively connected to said two-way valve for actuating same, and means associated with said two-way valve and continuously urging same to its closing position.

4. For use in connection with an internal combustion engine having speed governing means and also having operator operable control means associated with said speed governing means for selectively controlling the speed of said engine, said speed governing means being adjustable in an infinitely variable manner from a starting position to various positions of operation, a hydrostatic transmission which includes: a primary part comprising a hydropump adapted to be coupled to said engine, a first hydraulic adjusting cylinder-piston system operatively connected to said hydropump and operable to adjust the latter with regard to its quantity of delivery and its direction of delivery, a closed hydraulic circuit having said hydropump arranged therein, a secondary part comprising a hydromotor arranged in said closed circuit in series with said hydropump, a second hydraulic adjusting cylinder-piston system operatively connected to said hydromotor for adjusting the latter as to its desired delivery volume, pump means drivingly connectable to said engine for supplying actuating fluid to said first and second hydraulic adjusting cylinder-piston systems for respectively adjusting said hydropump and hydromotor, said pump means having a suction side connectable to a fluid reservoir and also having a pressure side, first conduit means connected to said pressure side and having an outlet connectable to said fluid reservoir, measuring orifice means arranged in said first conduit means, an adjusting element associated with said orifice means for adjusting the latter, said adjusting element being operatively connected to said speed governing means, manually operable brake means operatively connected to said adjusting element and operable to adjust said adjusting element independently of said speed governing means, first branch conduit means branching off from said first conduit means between said measuring orifice means and said outlet for communication with said first hydraulic adjusting cylinder-piston system, second branch conduit means likewise branching off from said first conduit means between said orifice means and said outlet for communication with said second hydraulic adjusting cylinder-piston system, and adjustable throttle means interposed in said first conduit means between said orifice means and said outlet.

* * * * *